United States Patent
Hammadou

(10) Patent No.: US 7,095,439 B2
(45) Date of Patent: Aug. 22, 2006

(54) IMAGE SENSOR CIRCUIT AND METHOD

(75) Inventor: Tarik Hammadou, Surry Hills (AU)

(73) Assignee: Motorola, Inc., Schaumburg, IL (US)

( * ) Notice: Subject to any disclaimer, the term of this patent is extended or adjusted under 35 U.S.C. 154(b) by 821 days.

(21) Appl. No.: 10/116,336

(22) Filed: Apr. 4, 2002

(65) Prior Publication Data

US 2003/0189657 A1    Oct. 9, 2003

(51) Int. Cl.
*H04N 5/335* (2006.01)
*H01L 31/062* (2006.01)
*G06K 7/10* (2006.01)

(52) U.S. Cl. .................. 348/308; 257/291; 382/312

(58) Field of Classification Search ............. 348/302, 348/297, 308, 241, 294; 250/208.1; 257/291, 257/292; 382/312
See application file for complete search history.

(56) References Cited

U.S. PATENT DOCUMENTS

| 4,160,279 | A | * | 7/1979 | Fuwa | 358/474 |
|---|---|---|---|---|---|
| 4,493,093 | A | * | 1/1985 | Veillard | 375/360 |
| 4,496,980 | A | * | 1/1985 | Pfleiderer et al. | 348/297 |
| 5,012,344 | A | | 4/1991 | Goto | |
| 5,412,587 | A | * | 5/1995 | Holt et al. | 708/250 |
| 5,461,425 | A | | 10/1995 | Fowler et al. | |
| 5,801,657 | A | * | 9/1998 | Fowler et al. | 341/155 |
| 6,310,571 | B1 | | 10/2001 | Yang et al. | |
| 6,380,880 | B1 | | 4/2002 | Bidermann | |
| 6,452,152 | B1 | | 9/2002 | Yang | |
| 6,525,304 | B1 | | 2/2003 | Merrill et al. | |
| 6,541,751 | B1 | | 4/2003 | Bidermann | |

* cited by examiner

*Primary Examiner*—Lin Ye
(74) *Attorney, Agent, or Firm*—Daniel K. Nichols

(57) ABSTRACT

A method and an image sensor circuit (2) for providing a bit stream pulse modulated signal at a controlled bit rate. The image sensor circuit (2) has a two-dimensional array of pixel signal pulse frequency modulators (22) each having a photodiode (32) for converting incident light into a varying signal voltage and a frequency-to-digital converter which generates a pulse frequency modulated signal from the varying signal voltage. The circuit 2 also has a sampling unit (24) which samples the pulse frequency modulated signal to generate the bit stream pulse modulated signal at said controlled bit rate. An arithmetic unit (26) is coupled to an output of the sampling unit (24) for performing stochastic processing on the bit stream pulse modulated signal.

13 Claims, 3 Drawing Sheets

IMAGE SENSOR CIRCUIT AND METHOD

FIELD OF THE INVENTION

This invention relates to an image sensor array. The invention is particularly useful for, but not necessarily limited to, digital pixel CMOS image sensors for motion detection, feature detection and recognition and object tracking.

BACKGROUND ART

An image sensor converts an optical image focused on the sensor into electrical signals. Typically, the image sensor comprises an array of light sensitive elements, each element producing a signal corresponding to the light intensity incident on that element. The signals may then be used, for example, to provide information about the optical image.

Some image sensors integrate a light sensitive device with signal processing circuits in each pixel of the array. Such image sensors are generally classified into either analog types or digital types. The analog type is generally suitable for light integration, but is far from robust against noise and therefore has less precision. The digital type is robust and more suitable to communication. However, it requires an Analog-to-Digital (A/D) converter and the capability to perform arithmetic operations, such as addition and multiplication, which are area consuming.

One common type of image sensor used in many consumer applications, such as digital cameras and camcorders, is a charge-coupled device (CCD). Some of the appeal of CCDs derives from their ability to produce an image and maintain their resolution when the illumination intensity is low. However, integrated circuits comprising CCD image sensors have a number of drawbacks including a relatively low yield, relatively high power consumption and a high cost of production, which is due to the specialized processing involved.

A much cheaper alternative to CCD image sensors are Complementary Metal Oxide Semiconductor (CMOS) image sensors that have a light sensitive element such as a photodiode, phototransistor or other suitable device, where the conductivity of the light sensitive device corresponds to incident light intensity on the element. A variable analog signal can therefore be generated by the light sensitive element. Light sensitive elements may be formed in a two dimensional core array, which is addressable both by row and by column. Once a row of elements has been addressed, the analog signals from each of the sensitive devices in the row are coupled to the respective columns in the array. An A/D converter may then be used to convert the analog signals on the columns to digital signals so as to provide only digital signals at the output of the image sensor that is typically formed in an integrated circuit.

U.S. Pat. No. 5,012,344, assigned to K.K. Toshiba, discloses a solid-state image pickup device that endeavors to address the complex and expensive manufacturing processes and insufficient signal-to-noise-ratios (SNRs) encountered with conventional image sensors. The image sensor disclosed employs a plurality of charge/voltage conversion elements in correspondence with a plurality of photosensitive elements. A control pulse generation circuit controls the integration of the signal charges, which ultimately leads to an improved SNR and simplified manufacturing of the image sensor. However, this image sensor still exhibits relatively high power consumption.

The introduction of semiconductor memory at the pixel level allows imaging data to be stored locally and accessed in a manner similar to a standard Dynamic Random Access Memory (DRAM). However, pixel level A/D conversion has a disadvantage of operation voltage reduction that accompanies deep sub-micron processes. This may directly affect the signal quality and thus deteriorate the SNR. In addition, if the area of a photodiode decreases then the signal capacity in the photodiode decreases causing degradation of the SNR.

Further to the above, A/D converters implemented at the pixel level often use very simple and robust circuits and operate in parallel. However, such an implementation requires a large pixel size, has high output data due to over-sampling, has poor low light performance and has inherent fixed pattern noise due to the analog components required. An example of a CMOS image sensor with pixel level A/D conversion is disclosed in U.S. Pat. No. 5,461,425, assigned to Stanford University. In the image sensor disclosed, analog signals generated by phototransistors are converted to a serial bit stream by an A/D converter connected at the output of each phototransistor and formed in the immediate area of each phototransistor within an array core. The provision of a separate digital stream output for each pixel element of the array core endeavors to minimize parasitic effects such as parasitic capacitances, resistances and inductances, to which large area pixel arrays are susceptible. This sensor uses Sigma-Delta modulation and Nyquist samped data rates. Although this sensor is useful, there is a need for a two-dimensional image sensor that possess improved signal processing characteristics and reduces signal deterioration effects due to inherent D/A conversion that is required in these types of image sensors.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method of generating a bit stream pulse modulated signal at a controlled bit rate, said method including the steps of:
  converting light into an electrical signal having a varying signal voltage dependent on the intensity of said light;
  generating pulses from said varying signal voltage;
  frequency modulating said pulses to generate a pulse frequency modulated signal; and
  sampling said pulse frequency modulated signal to generate said bit stream pulse modulated signal at said controlled bit rate.

Preferably, said step of generating pulses may be effected by comparing said varying signal voltage with a reference voltage, said pulses having edges resulting from said signal voltage crossing said reference voltage.

Suitably, the step of sampling may include providing a sampling frequency and proving the bit stream pulse modulated signal at said bit rate that is at least twice the sampling frequency.

Preferably, the method may further include the step of stochastic processing of said bit stream pulse modulated signal.

Suitably, the step of stochastic processing may include generating binary values from said bit stream pulse modulated signal.

Suitably, the step of stochastic processing may include generating binary values from said bit stream pulse modulated signal, wherein each of said binary values corresponds to said bit stream pulse modulated signal provided over an integer multiple of said sampling rate.

Suitably, the step of stochastic processing may be effected by binary logic.

Preferably, the method may be effected by an image sensor.

According to another aspect of the invention there is provided an image sensor array for providing a bit stream pulse modulated signal at a controlled bit rate, the image sensor circuit comprising:

a two-dimensional array of pixel signal pulse frequency modulators each having:

a light sensitive element for converting incident light into a varying signal voltage dependent on the intensity of said light, and a frequency-to-digital converter (FDC) which generates a pulse frequency modulated signal from said varying signal voltage; and a sampling unit which samples said pulse frequency modulated signal to generate said bit stream pulse modulated signal at said controlled bit rate.

Preferably, said light sensitive elements may be photodiodes.

Suitably, said FDC may comprise a comparator and two inverters for converting said varying electrical signal voltage into pulses.

Suitably, said sampling unit may comprise a signal generator outputting a signal at said controlled bit rate to a shift register.

Preferably, said bit stream pulse modulated signal at a controlled bit rate may be input to an arithmetic unit for performing stochastic processing on said bit stream pulse modulated signal.

Preferably, said arithmetic unit may comprise binary logic circuits for performing said stochastic processing.

Suitably, the image sensor array may comprise an array of pixel processing circuits that include said array of pixel signal pulse frequency modulators, at least one of said sampler units and a common said arithmetic unit.

Further aspects of the invention will become apparent from the following detailed description.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE PREFERRED EMBODIMENT OF THE INVENTION

Figure 1:
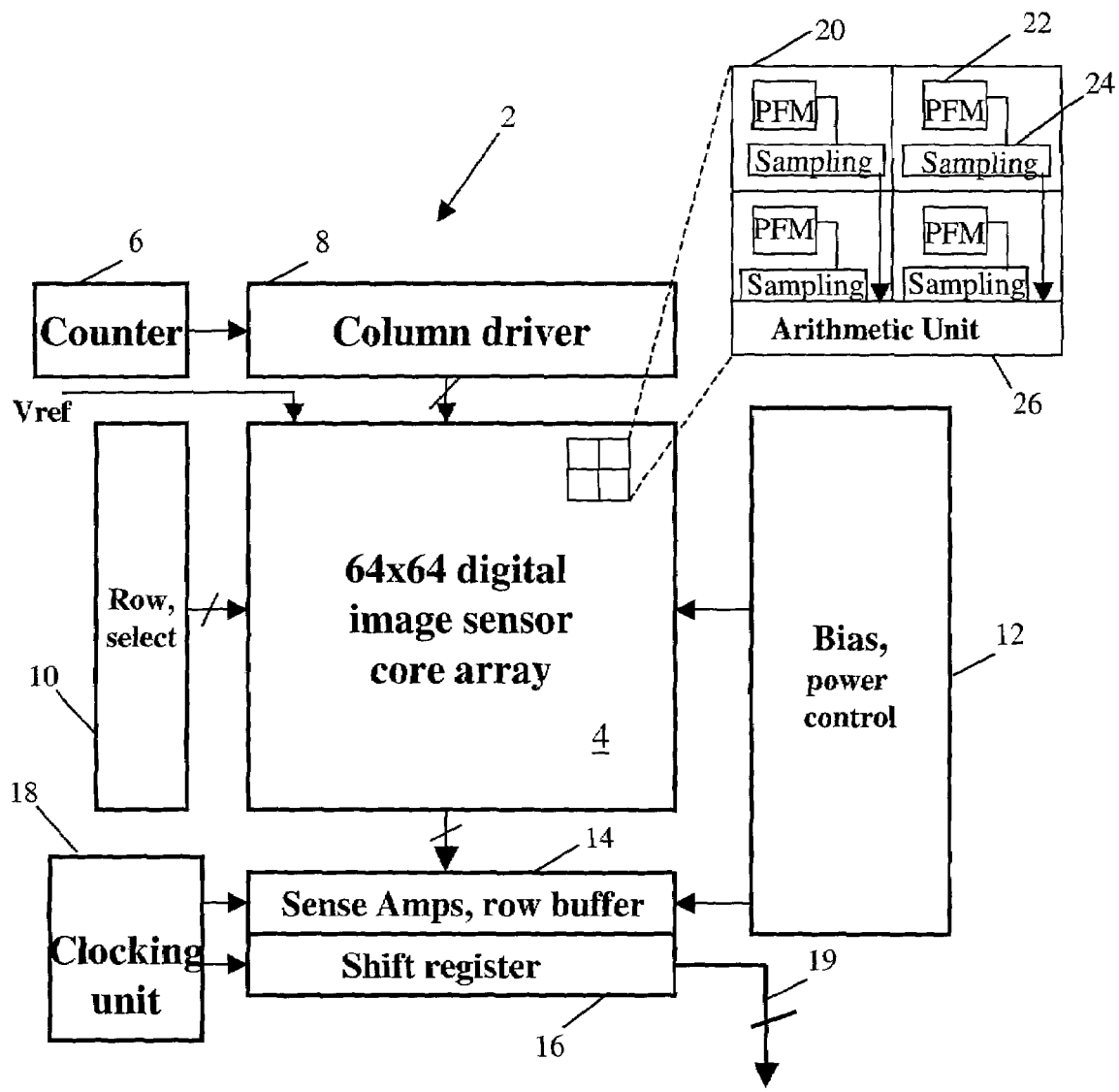
FIG. 1 is a block diagram illustrating an embodiment of the components and of an image sensor array and associated circuitry in accordance with the invention.

In the drawings, like numerals on different FIGs are used to indicate like elements throughout. With reference to FIG. 1, there is illustrated an integrated circuit for a CMOS image sensor 2. The CMOS image sensor 2 typically comprises a two-dimensional core array 4 of 64×64 pixel signal pulse frequency modulators 22, the array 4 being addressable by row and column by virtue of a counter 6, column driver 8 and row selector 10. A reference voltage Vref is supplied to the core array 4 and power to the array 4 is controlled by a bias power control unit 12. The power control unit 12 also controls power to a row buffer 14, which receives the output data from the core array 4. The output data from the core array 4 is transferred from the row buffer 14 to a shift register 16 before it is provided at an output bus 19. A clocking unit 18 is coupled to the row buffer 14 and the shift register 16 to provide clocking of data from the image sensor 2.

FIG. 1 also shows a schematic enlargement of an area of the core array 4 that forms a pixel processing circuit 20. Each pixel processing circuit 20 comprises signal pulse frequency modulators 22 responsible for light detection and frequency modulation and associated sampler units 24. The output of each of the sampler units 24 is supplied to the input of a binary arithmetic unit 26. In FIG. 1, one common binary arithmetic unit 26 is shown as being shared by an array of 2×2 pixel signal pulse frequency modulators 22. However, the invention is not limited to such an arrangement and the input to each arithmetic unit 26 may originate from a larger or smaller number of pixel signal pulse frequency modulators 22. The outputs for the binary arithmetic units 26 of the core array 4 are input to the row buffer 14.

Figure 2:
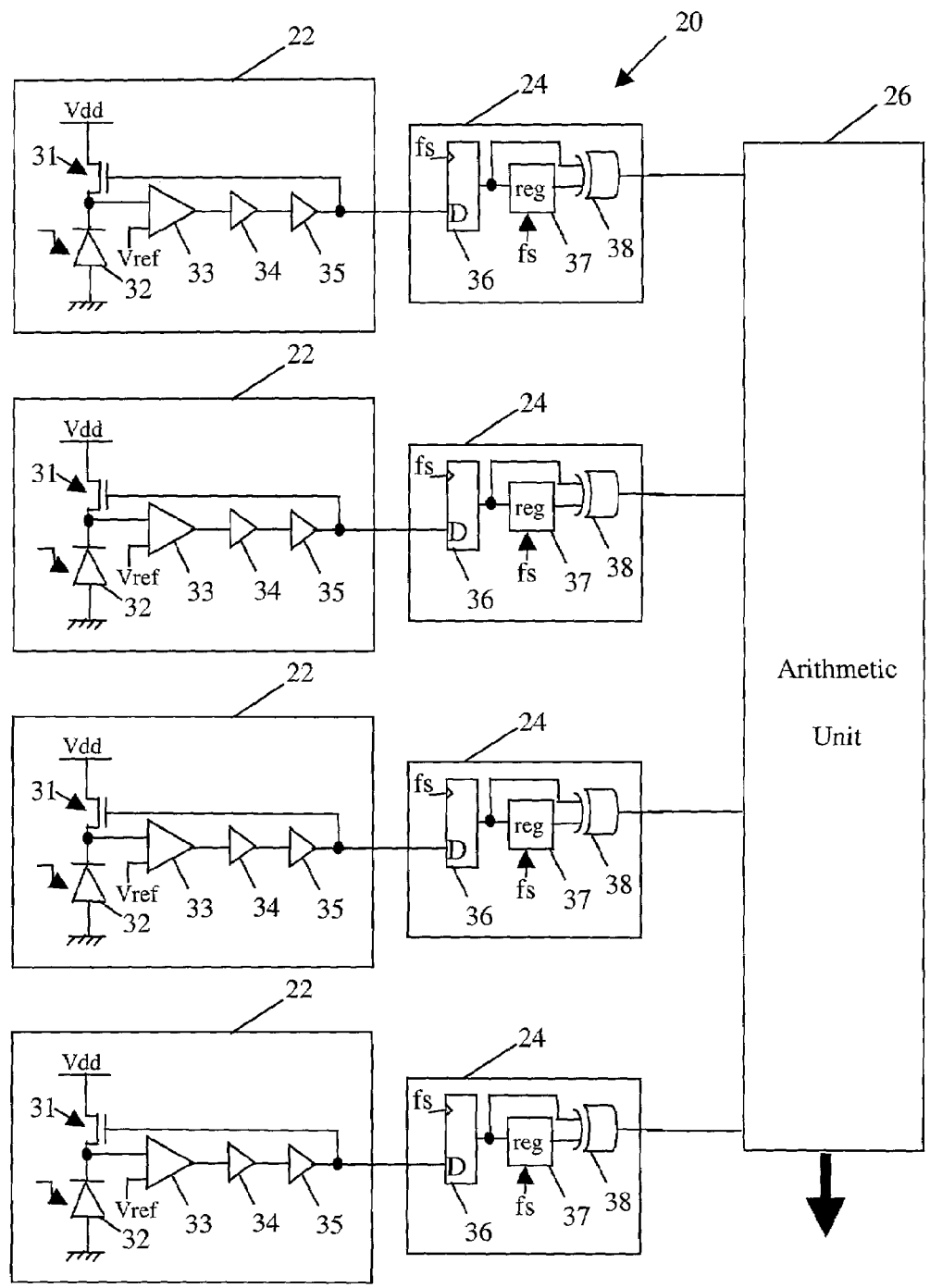
FIG. 2 is a schematic diagram illustrating in detail components of a pixel processing circuit forming the image sensor array.

In FIG. 2 there is illustrated a detailed diagram of a pixel processing circuit 20. As shown, each of the pixel signal pulse frequency modulators 22 comprises a light sensitive element in the form of a photodiode 32 with an anode coupled to ground and cathode coupled to both a source electrode of a Field Effect Transistor 31 (FET) and an input of a comparator 33. A drain electrode of the FET 31 is coupled to a supply voltage (Vdd). The comparator 33 has a reference input coupled to a reference voltage Vref and an output of the comparator 33 is coupled to buffering circuitry in the form of series connected inverters 34 and 35. An output of inverter 35 is coupled to a gate electrode of FET 31. The output of pixel signal pulse frequency modulators 22 is from the inverter 35 and is coupled to a respective sampler unit 24 to provide a stream of frequency modulated pulses that are input to a sampler unit 24. The sampler unit 24 provides a bit stream output at a predetermined sampling rate or sampling frequency fs that is then input to the arithmetic unit 26. Stochastic arithmetic is then performed by the binary arithmetic unit 26 on the bit stream resulting in a digital output.

The photodiode 32 acts as a variable current source controlled by the intensity of incident light that is converted into an electrical signal (pixel signal) by the photodiode 32 which is charged through the FET 31. The magnitude of the pixel signal depends on the intensity of the incident light.

The gate electrode of the FET 31 is switched by a feedback loop comprising the comparator 33 and the two inverters 34,35 (in one alternative form, a latch may replace the two inverters 34,35).

An analog value of the light intensity is consequently converted into a pulse train digital signal and it is upon the pulse train digital signal that the operation of frequency modulation is executed. This will now be described in more detail.

For instance, in a first time interval T1, if the voltage stored across the photodiode 32 is larger than the threshold voltage Vref of the comparator 33, then the output of the comparator 33 and the inverters 34,35 will be at logic levels "0", "1" and "0", respectively. Thus, the FET 31 is in an "OFF-state". As light alters the capacitance of the photodiode 32, the voltage across the photodiode 32 gradually drops (at a rate dependent on the incident light intensity) from a reset voltage near $V_{dd}$ by the photocurrent $I_{ph}$ and finally reaches the threshold value $V_{th}$ of the comparator 54. After time delay t, which corresponds to a second time interval T2, the outputs of the comparator 54 and the inverters 34,35 are then at logic levels "1", "0" and "1", respectively. The FET 31 is then switched to an ON-state, which resets (recharges) the photodiode 32.

Due to the time delay of the circuit components, the photodiode 32 is kept charged until the output of inverter 35 has changed to logic 0. This period is a third time interval T3. By repeating these three stages, pulse trains are produced. If the time delay t is assumed to be small, the oscillation frequency f can be expressed as:

$$f = \frac{I_{ph}}{C_{PD}(V_{dd} - V_{th})}, \quad (1)$$

where $C_{PD}$ is the capacitance of the photodiode 32.

From equation (1) it can be concluded that the oscillation frequency f, or the firing rate, increases if the input light intensity becomes large and the size of the photodiode 32 becomes small. This therefore makes the comparator 33, inverters 34,35 and FET 31 circuitry, when coupled to the photodiode 32, a Frequency-to-Digital converter (FDC) suitable for low voltage operations and deep sub-micron technology. Thus, a frequency modulated signal is provided at the output of the pixel signal pulse frequency modulator 22.

The output of the pixel signal pulse frequency modulator 22 is coupled to the sampler unit 24. Each of the sampler units 24 comprises a one-bit counter. This counter is implemented by a D type flip-flop 36, a one-bit subtractor without carry in the form of an XOR gate 38 and an N-bit shift register 37. A sampling frequency fs is provided by a signal generator (not shown) to the D type flip-flop 36 and register 37. This specific sampler unit 24 counts both the rising and falling edges of the frequency modulated signals output to provide the bit stream pulse modulated signals at a bit rate that is twice the sampling frequency fs.

Given a set of analog pixel inputs that are frequency modulated by modulators 22 and sampled by sampler unit 24, the resultant bit stream output is input to the binary arithmetic unit 26 that is common to the four pixel signal pulse frequency modulator units 22 and sampler units 24 of the pixel processing circuit 20. In the arithmetic unit 26, the bit stream is stochastically converted, processed, and finally recovered from the stochastic pulse stream as a digital value. One of the main advantages of the stochastic processing system is the possibility of effecting pseudo-analog functions with the values of the pulse stream with a purely digital implementation.

It should be noted that a probability cannot be exactly measured from the bit stream using stochastic arithmetic. However a probability can be estimated as the relative frequency of high levels, or 1s, in a sufficiently long sequence. As a consequence, the stochastic computing introduces errors in the form of variance when an attempt is made to estimate the number from the sequence.

If $$Z = \sum_i \frac{X_i}{n}$$

is the relative frequency of 1s in an n-pulse sequence $X_1$, $X_2$, ..., $X_n$ of length n, the expectation value E[Z] and variance Var[Z] of Z are given respectively by equations -(2) and -(3):

$$E[Z] = \frac{\sum_1^n \mu_i}{n} \quad (2)$$

$$Var[Z] = E[Z - E[Z]]^2 = \frac{1}{n^2}\sum_i \sigma_i^2, \quad (3)$$

where $\mu_i$ and $\sigma_i$ are the mean value and typical deviation respectively of each $X_i$.

An advantage of stochastic arithmetic is the similarity between Boolean algebra and statistical algebra, which allows the implementation of simple arithmetic operations. The product operation can be implemented by an AND gate, provided that the input pulse streams are uncorrected. If $X_1$, $X_2$ are the input pulse streams of the AND gate, the output pulse will only have a high level when both $X_1$, $X_2$ have a high level.

The OR gate is well suited when we are working with low pulse densities. In the case of high pulse densities, the adder will be implemented using the combination of the following equations -(4) and -(5):

$$\text{add}(X_1, X_2) = X_1 \oplus X_2 + X_1 \oplus \overline{(\text{sig}(X_1) \oplus \text{sig}(X_2))} \quad (4)$$

$$\text{sig}[\text{add}(X_1, X_2)] = X_1 \text{sig}(X_1) + X_2 \text{sig}(X_2) \quad (5)$$

The truth table for the adder is shown in table 1.

TABLE 1

Stochastic Arithmetic for an Adder

| $X_1$ | $SX_1$ | $X_2$ | $SX_2$ | $(X_1 + X_2)$ | $S(X_1 + X_2)$ |
|---|---|---|---|---|---|
| 0 | 0 | 0 | 0 | 0 | — |
| 0 | 0 | 0 | 1 | 0 | — |
| 0 | 0 | 1 | 0 | 1 | 0 |
| 0 | 0 | 1 | 1 | 1 | 1 |
| 0 | 1 | 0 | 0 | 0 | — |
| 0 | 1 | 0 | 1 | 0 | — |
| 0 | 1 | 1 | 0 | 1 | 0 |
| 0 | 1 | 1 | 1 | 1 | 1 |
| 1 | 0 | 0 | 0 | 0 | 0 |
| 1 | 0 | 0 | 1 | 0 | 0 |
| 1 | 0 | 1 | 0 | 1 | 0 |
| 1 | 0 | 1 | 1 | 1 | — |
| 1 | 1 | 0 | 0 | 0 | 1 |
| 1 | 1 | 0 | 1 | 0 | 1 |
| 1 | 1 | 1 | 0 | 1 | — |
| 1 | 1 | 1 | 1 | 1 | 1 |

As will be apparent to a person skilled in the art, stochastic arithmetic can be implemented at the pixel level for many different applications.

Figure 3:
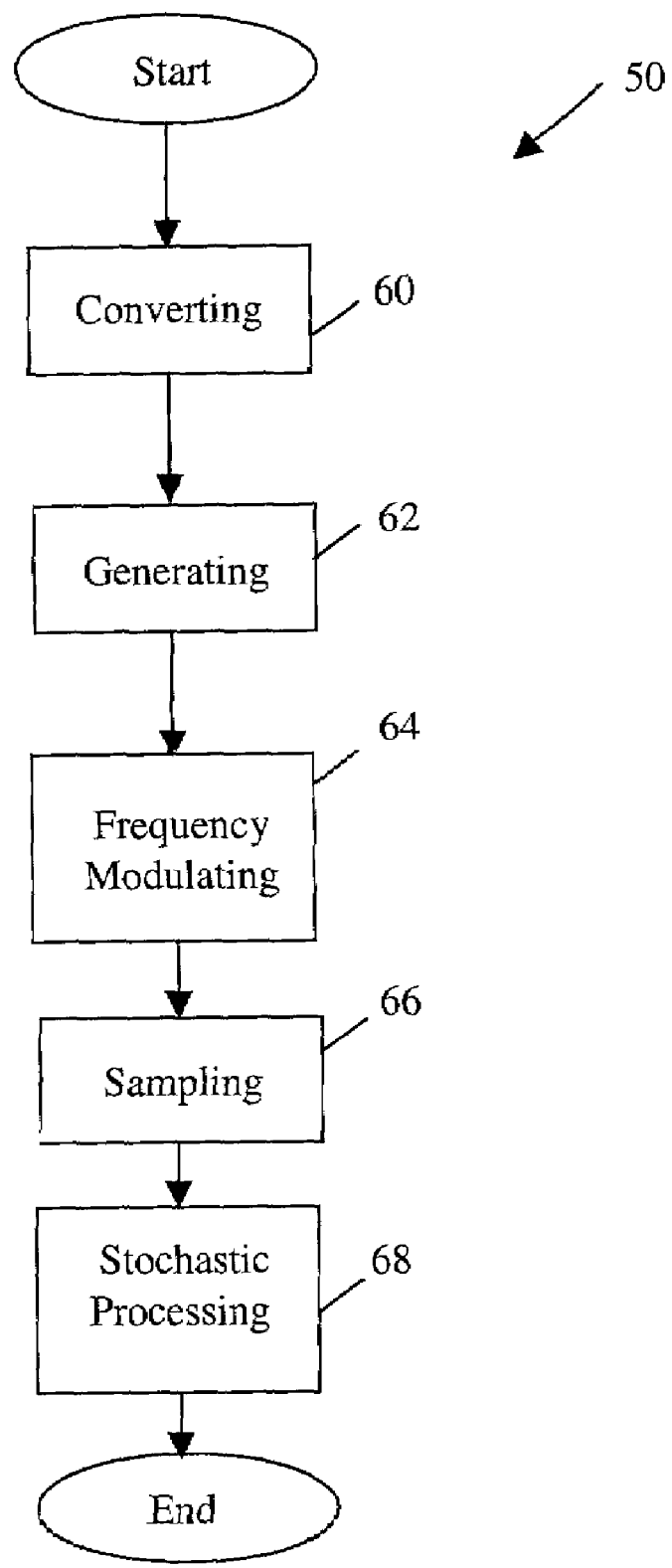
FIG. 3 is a flow chart illustrating a method of generating a bit stream pulse modulated signal at a controlled bit rate in accordance with the invention.

In operation, the present invention provides for a method 50 of generating a bit stream pulse modulated signal at a controlled bit rate as described with reference to the flowchart in FIG. 3.

The method 50 firstly effects a converting step 60 for converting light into an electrical signal having a varying signal voltage dependent on the intensity of the light incident on each of the photodiodes 32. A generating step 62 then provides for generating pulses from the varying signal voltage, edges of these pulses originate at the output of each comparator 33 when the signal voltage across the photodiode 32 crosses the reference Voltage Vref. Accordingly, a pulse edge is generated by the comparator 33 that compares the varying signal voltage with the reference voltage Vref. A frequency modulating step 64 then provides for frequency modulating the pulses to generate a pulse frequency modulated signal, this is achieved by the components of the pixel signal pulse frequency modulator 22.

As represented by a sampling step 66, the pulse frequency modulated signal is input to an associated one of the sampler units 24. Therefore the sampling step 66 provides for sampling the pulse frequency modulated signal to generate the bit stream pulse modulated signal at a controlled bit rate. The sampler units 24 count both the rising and falling edges of the frequency modulated pulses so that the controlled bit rate is at least twice that of the sampling frequency fs. This doubles the resolution of the image sensor 2 as the bit stream pulse modulated signal at the output of the sampling unit 24 are twice the sampling frequency fs.

At a stochastic processing step 68, the bit stream pulse modulated signal from each of the sampler units 24 is input to the arithmetic unit 26 for stochastic processing. The stochastic processing may be effected by binary logic, such as illustrated in table 1, which simplifies the circuitry and minimizes the required integrated circuit area. Hence, stochastic processing step 68 provides for generating binary values from the bit stream pulse modulated signal, wherein each of the binary values corresponds to the bit stream pulse modulated signal provided over an integer multiple of the sampling frequency (sampling rate).

In this invention, novel sensor architecture has been described, which is based on pulse frequency modulation (PFM) and stochastic arithmetic to realize an image sensor where functional circuits are integrated in each pixel. In the present invention, the input signal is coded as the rate parameter of a pulse frequency modulation and stochastic computing operation is then performed in the pulse domain.

The present invention is implemented in CMOS technology and utilizes a frequency modulator as an integrator to achieve a simplified first order Sigma-Delta modulator with multi-bit quantization and without the need for D/A converters. PFM is very compatible with digital logic circuits and robust against noise, and thus applicable to deep submicron technology. Another advantage is that the output is a pulse train, therefore the operation voltage hardly affects the SNR. However, the low operation voltage is a further advantage, especially over the prior art CCD devices, and renders the invention particularly suited to deep sub-micron technology.

Each pixel signal pulse frequency modulator 20 includes a simple oscillator based on a digital trigger comparator. Pulse mode digital arithmetic is then implemented, which uses stochastic computing techniques with simple logic gates to achieve image-processing operations.

The detailed description provides preferred exemplary embodiments only, and is not intended to limit the scope, applicability, or configuration of the invention. Rather, the detailed description of the preferred exemplary embodiments provides those skilled in the art with an enabling description for implementing a preferred exemplary embodiment of the invention. It should be understood that various changes may be made in the function and arrangement of elements without departing from the spirit and scope of the invention as set forth in the appended claims.

We claim:

1. A method of generating a bit stream pulse modulated signal at a controlled bit rate, said method including the steps of:
   converting light into an electrical signal having a varying signal voltage dependent on the intensity of said light, the converting being effected by light sensitive capacitive element coupled to a supply rail through a transistor;
   generating pulses from said varying signal voltage, said pulses being dependent on a charge stored by the light sensitive capacitive element;
   frequency modulating said pulses to generate a pulse frequency modulated signal, the frequency modulating being effected by a feedback signal supplied to a control input of the transistor, wherein the feedback signal is dependent on said pulses; and
   sampling said pulse frequency modulated signal to generate said bit stream pulse modulated signal at said controlled bit rate.

2. A method as claimed in claim 1, wherein said step of generating pulses is effected by comparing said varying signal voltage with a reference voltage, said pulses having edges resulting from said signal voltage crossing said reference voltage.

3. A method as claimed in claim 1, wherein the step of sampling includes providing a sampling frequency and providing the bit stream pulse modulated signal at said bit rate that is at least twice the sampling frequency.

4. A method as claimed in claim 1, further including a step of stochastic processing of said bit stream pulse modulated signal.

5. A method as claimed in claim 4, wherein the step of stochastic processing includes generating binary values from said bit stream pulse modulated signal.

6. A method as claimed in claim 5, wherein, the step of stochastic processing includes generating binary values from said bit stream pulse modulated signal, wherein each of said binary values corresponds to said bit stream pulse modulated signal provided over an integer multiple of said sampling rate.

7. A method as claimed in claim 6, wherein, the step of stochastic processing is effected by binary logic.

8. A method as claimed in claim 1, wherein the method is effected by an image sensor.

9. An image sensor array for providing a bit stream pulse modulated signal at a controlled bit rate, the image sensor circuit comprising:
   a two-dimensional array of pixel signal pulse frequency modulators each having:
   a transistor coupled to supply rail;
   a light sensitive capacitive element coupled to the supply rail through the transistor, the light sensitive capacitive element having a signal output providing for converting incident light into a varying signal voltage that is dependent on light intensity detected by the light sensitive capacitive element,
   a comparator having a constant reference voltage input and a signal input coupled to the signal output;
   a feedback loop coupling an output of the comparator to a control input of the transistor to pulse frequency modulate said varying signal voltage thereby providing a pulse frequency modulated signal; and a sampling unit which samples said pulse frequency modulated signal to generate said bit stream pulse modulated signal at said controlled bit rate.

10. An image sensor array as claimed in claim 9, wherein said light sensitive capacitive element is a photodiode.

11. An image sensor array as claimed in claim 9, wherein said sampling unit comprises a signal generator outputting a signal at said controlled bit rate to a shift register.

12. An image sensor array as claimed in claim 9, wherein said bit stream pulse modulated signal at a controlled bit rate is input to an arithmetic unit for performing stochastic processing on said bit stream pulse modulated signal.

13. An image sensor array as claimed in claim 12, wherein said arithmetic unit comprises binary logic circuits for performing said stochastic processing.

* * * * *